April 6, 1948.　　　B. KUJAWSKI　　　2,439,009
FLEXIBLE JOINT
Filed Oct. 29, 1943
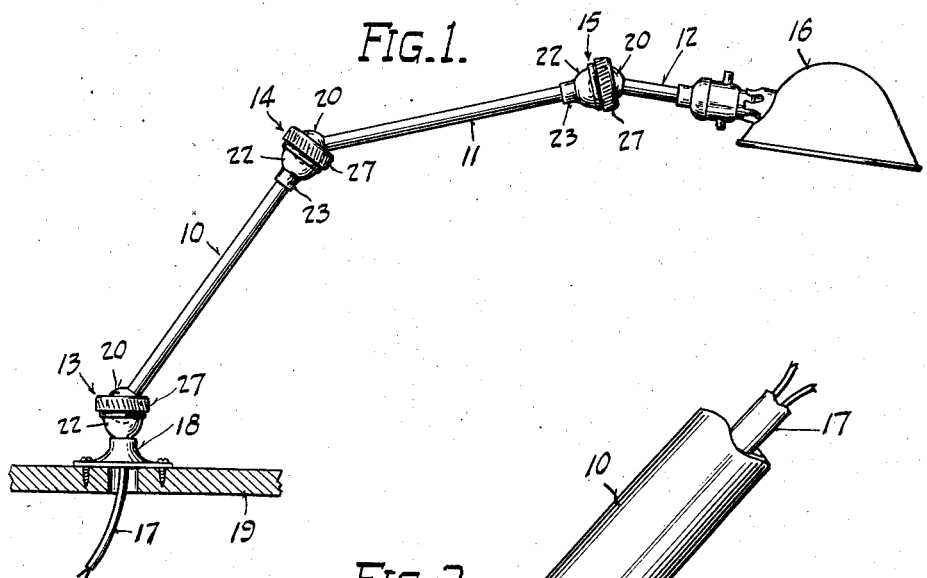
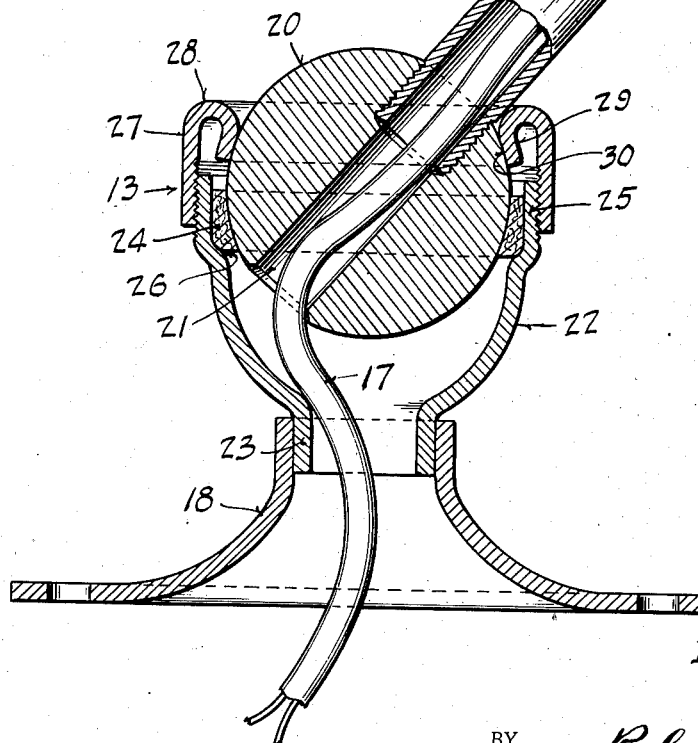
Barney Kujawski
INVENTOR.
BY Ralphw Brown.
ATTORNEY.

Patented Apr. 6, 1948

2,439,009

UNITED STATES PATENT OFFICE 2,439,009

FLEXIBLE JOINT

Barney Kujawski, Milwaukee, Wis., assignor to Thurner Engineering Company, Milwaukee, Wis., a corporation of Wisconsin Application October 29, 1943, Serial No. 508,154

7 Claims. (Cl. 287—87)

This invention relates to flexible joints of the ball and socket type for use primarily in articulated wiring conduits, such as flexible supports for electric lamps and the like, although other uses are contemplated.

One object of the present invention is to provide a flexible joint of the ball and socket type capable of easy manual adjustment and so constructed as to effectively maintain any position of adjustment to which it may be set.

Another object is to provide a flexible joint of the ball and socket type capable of maintaining any position of adjustment and so constructed as to accommodate wiring threaded therethrough in all positions of adjustment.

Other more specific objects and advantages will appear, expressed or implied, from the following description of an illustrative embodiment of the present invention.

In the accompanying drawings:

Figure 1 is a view in side elevation of an electric lamp support including flexible joints constructed in accordance with the present invention.

Fig. 2 is a sectional view through one of the joints shown in Fig. 1.

The lamp support selected for illustration includes a plurality of sections of conduit 10, 11 and 12 interconnected by flexible joints 13, 14 and 15 of the ball and socket type. The upper end of conduit section 12 supports a conventional electric lamp 16 energized by appropriate wiring 17 threaded through the articulated conduit thus provided. The lower end joint 13 is fixed to an appropriate mounting bracket 18 by which it may be anchored to a table or other suitable support 19.

The several joints shown are of like construction. As shown particularly in Fig. 2, each comprises a ball 20, preferably of metal, containing a central bore or channel 21 extending therethrough and tapped at one end to provide anchorage for one end of a conduit section 10 screwed thereinto.

Each joint also includes a housing 22 preferably of cup-like form terminating at its bottom in a hollow neck 23 adapted to be fixed in the bracket 18, as indicated in Fig. 2, or to fixedly receive an end of a conduit section 10 or 11, as indicated in Fig. 1.

A brake ring 24, seated within the upper rim 25 of the housing and positioned by a circular shoulder 26 within the housing, constitutes a seat for the ball 20 with its inner face in gripping contact with the ball. The ring 24 contacts the ball within a zone closely adjacent a great circle of the ball and is preferably of fibre, leather or like material readily conformable to the surface of the ball to thus insure intimate braking contact therewith throughout the depth of the ring.

The rim 25 of the housing is in this instance externally threaded to receive a clamp ring 27 adapted to forcibly press the ball 20 against the seating ring 24. The clamp ring shown is specially designed to exert a maximum effective pressure and grip upon the ball 20 and for that purpose it is bent, as at 28, to form a reversely directed flange 29 spaced inwardly from the body of the ring 27. The flange 29 is inclined outwardly and downward and its inner face 30 is shaped to bear against the ball in a zone closely adjacent a great circle of the ball. Suspended as it is from the bent portion 28, the flange 29 constitutes a ball-gripping band of sufficient flexibility to conform to the ball and sufficiently resilient to maintain an effective grip on the ball even after considerable wear.

It will be noted that since the ring seat 24 and gripping band 29 contact the ball in zones at opposite sides of but adjacent the center of the ball, a highly effective wedge-like gripping action against the ball is effected by screwing the clamp ring 27 downwardly along the rim 25 of the housing. This gripping action is sufficient to maintain the ball in any position of angular adjustment to which it may be set and, because of this characteristic, the joint disclosed is particularly well adapted for the support of lamps and the like.

Various changes may be made in the embodiment of the invention hereinabove specifically described without departing from or sacrificing the advantages of the invention as defined in the appended claims.

I claim:

1. In a flexible joint the combination of a ball, an element carried thereby, a housing, a fixed brake ring seated in and radially braced by said housing and having an internal surface forming a seat for said ball, a clamp ring on said housing adjustable axially thereof, and a band suspended within said clamp ring and having an internal surface for contact with said ball, said band and first named ring being arranged to grip said ball in zones at opposite sides of but adjacent the center of said ball to effectively retain the latter in any position of adjustment therebetween.

2. In a flexible joint the combination of a ball having an opening therethrough, a conduit carried by said ball and communicating with said opening, a housing, a brake ring seated in and radially braced by said housing and having an internal surface forming a seat for said ball to maintain said ball spaced from the bottom of said housing, a clamp ring on said housing adjustable axially thereof, and a band suspended within said clamp ring and having an internal surface for gripping contact with said ball, the bottom of said housing having an opening through which wiring may be admitted to and through said ball and conduit.

3. In a flexible joint the combination of a ball, an element carried thereby, a housing, a nonmetallic brake ring seated in and radially braced by said housing and having an internal surface forming a seat for said ball, said surface contacting said ball throughout a zone adjacent a great circle of said ball, a clamp ring on said housing adjustable axially thereof, and a band suspended within said clamp ring and having an internal surface for gripping contact with said ball in a zone adjacent and parallel to said first named zone, said zones of contact being at opposite sides of the center of said ball.

4. In a flexible joint the combination of a ball, a housing having an internal circular shoulder, a brake ring seated in and radially braced by said housing and positioned by said shoulder, said ring having an internal surface forming a seat for said ball, a clamp ring on said housing and adjustable axially thereof, and a band suspended within said clamp ring and having an internal surface for gripping contact with said ball within a zone adjacent a great circle of said ball.

5. In a flexible joint the combination of a ball, an element carried thereby, a housing, means within said housing having a surface for contacting said ball in a zone adjacent a great circle of said ball, and a clamp ring on said housing adjustable axially thereof, said clamp ring being bent to form an internal reversely directed flange inclined outwardly and downwardly and having an internal surface for gripping contact with said ball within a zone adjacent and parallel to said first named zone, said zones of contact being disposed at opposite sides of the center of said ball.

6. An adjustable support for lamps and the like comprising a plurality of elements, and a plurality of means connecting said elements in series, each of said connecting means comprising a ball secured to one of said elements, a housing secured to another of said elements, a brake ring in said housing forming a seat for said ball, a clamp ring on said housing adjustable axially thereof, and a band suspended within said clamp ring and having an internal surface in gripping contact with said ball, said band and first named ring contacting said ball at opposite sides of the center of the latter to retain said ball in various positions of angular adjustment therebetween.

7. An adjustable support for lamps and the like comprising a plurality of conduits, and a plurality of means connecting said conduits in series, each of said connecting means comprising a ball secured to one of said conduits and having an opening therethrough communicating with the latter, a hollow member secured to another of said conduits and providing a seat for said ball, a brake ring on said member adjustable axially thereof, and a band suspended within said ring and having an internal surface in gripping contact with said ball, said seat and band contacting said ball at opposite sides of the center of the latter to retain said ball in various positions of angular adjustment therebetween.

BARNEY KUJAWSKI.

REFERENCES CITED

The following references are of record in the file of this patent:

UNITED STATES PATENTS

| Number | Name | Date |
| --- | --- | --- |
| 199,936 | Rowland | Feb. 5, 1878 |
| 357,337 | Rosenblatt | Feb. 8, 1887 |
| 2,041,847 | Marchand | May 26, 1936 |
| 2,288,767 | Young | July 7, 1942 |

FOREIGN PATENTS

| Number | Country | Date |
| --- | --- | --- |
| 565,870 | France | Nov. 13, 1923 |